(12) United States Patent
Liao

(10) Patent No.: US 9,217,844 B2
(45) Date of Patent: Dec. 22, 2015

(54) IMAGING LENS MODULE

(71) Applicant: ABILITY OPTO-ELECTRONICS TECHNOLOGY CO., LTD., Taichung (TW)

(72) Inventor: Kuo-Yu Liao, Taichung (TW)

(73) Assignee: Ability Opto-Electronics Technology Co., LTD., Taichung (TW)

( * ) Notice: Subject to any disclaimer, the term of this patent is extended or adjusted under 35 U.S.C. 154(b) by 0 days.

(21) Appl. No.: 14/174,457

(22) Filed: Feb. 6, 2014

(65) Prior Publication Data

US 2015/0077868 A1 Mar. 19, 2015

(30) Foreign Application Priority Data

Sep. 18, 2013 (TW) .............................. 102217635 U

(51) Int. Cl.
*G02B 3/02* (2006.01)
*G02B 13/00* (2006.01)
(52) U.S. Cl.
CPC ................................ *G02B 13/0035* (2013.01)

(58) Field of Classification Search
CPC ..... G02B 13/002; G02B 13/0035; G02B 13/18
USPC .................................................. 359/716, 708
See application file for complete search history.

(56) References Cited

U.S. PATENT DOCUMENTS 7,436,603 B2 * 10/2008 Huang et al. ................... 359/716

* cited by examiner

*Primary Examiner* — James Greece
(74) *Attorney, Agent, or Firm* — LeClairRyan

(57) ABSTRACT

An imaging lens module includes first, second and third optical lenses that are arranged sequentially from an object side to an image side along an optical axis, and a constant-aperture diaphragm disposed between the first and second optical lenses. The first optical lens has a positive refractive power, and the second optical lens has a negative refractive power. The third optical lens has a positive refractive power and has an object-side surface and an image-side surface, At least one of which has at least an inflection point. The imaging lens module satisfies: $0.8 < TL/Dg < 1.1$, in which, TL is a length from an imaging plane to the object-side surface of the first optical lens, and Dg is a length of a diagonal line of a maximum viewing angle on the imaging plane.

2 Claims, 6 Drawing Sheets

IMAGING LENS MODULE

CROSS-REFERENCE TO RELATED APPLICATION

This application claims priority of Taiwanese Application No. 102217635, filed on Sep. 18, 2013.

BACKGROUND OF THE INVENTION

1. Field of the Invention

The present invention relates to an imaging lens module.

2. Description of the Related Art

An imaging lens module is generally adopted in a mobile phone, a smart phone, a tablet computer, a notebook computer or an imaging lens assembly. With the rapid development of technology, these electronic devices are designed to be increasingly thinner. Therefore, the imaging lens module for these electronic devices should be made correspondingly thinner as well. Moreover, the imaging lens module should be developed more wide-angle in order to increase a resolving power thereof.

Conventional imaging lens modules including three lenses do not satisfy the thin and wide-angle requirements, such as those disclosed in Taiwanese Patent Nos. 1395991, 1288857 and 1271540 and Taiwanese Patent Application Publication Nos. 201226962 and 201115179.

SUMMARY OF THE INVENTION

Therefore, an object of the present invention is to provide an imaging lens module that may alleviate at least one of the above drawbacks of the prior art.

Accordingly, an imaging lens module includes an optical lens set including first, second and third optical lenses that are arranged sequentially from an object side to an image side along an optical axis of said imaging lens module, and a constant-aperture diaphragm disposed between the first optical lens and the second optical lens.

The first optical lens has a positive refractive power near the optical axis. The first optical lens has a convex object-side surface that faces the object side, and an image-side surface that faces the image side and that has a concave surface segment near the optical axis. At least one of the object-side surface and the image-side surface of the first optical lens is aspheric.

The second optical lens has a negative refractive power near the optical axis. The second optical lens has an object-side surface that faces the object side and that has a concave surface segment near the optical axis, and a convex image-side surface that faces the image side. At least one of the object-side surface and the image-side surface of the second optical lens is aspheric.

The third optical lens has a positive refractive power near the optical axis. The third optical lens has an aspheric object-side surface that faces the object side, an asperhic image-side surface that faces the image side, and a peripheral surface that interconnects the object-side surface and the image-side surface. At least one of the object-side surface and the image-side surface of the third optical lens has at least one inflection point between the optical axis and the peripheral surface.

The imaging lens module satisfies the following optical condition:

$$0.8 < TL/Dg < 1.1,$$

in which, TL represents a length from an imaging plane to the object-side surface of the first optical lens along the optical axis, and Dg represents a length of a diagonal line of a maximum viewing angle on the imaging plane.

BRIEF DESCRIPTION OF THE DRAWINGS

Other features and advantages of the present invention will be come apparent in the following detailed description of the preferred embodiments with reference to the accompanying drawings, of which.

DETAILED DESCRIPTION OF THE PREFERRED EMBODIMENTS

Figure 1:
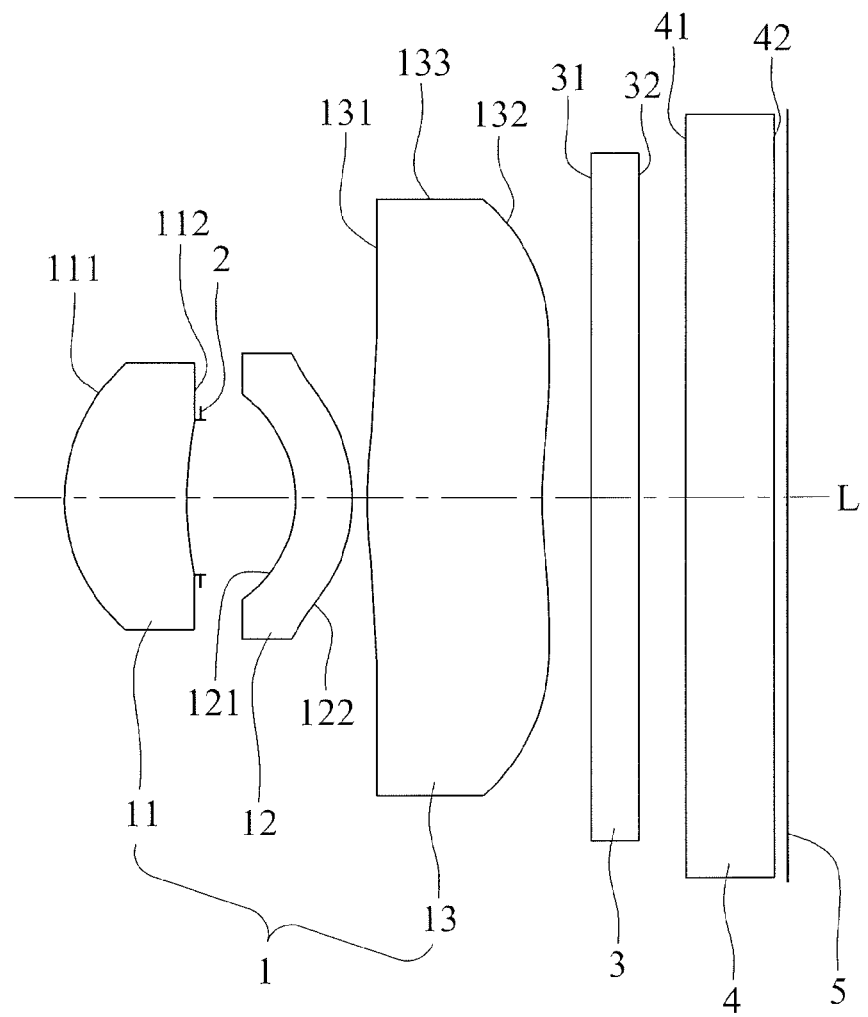
FIG. 1 is a schematic view of a first preferred embodiment of an imaging lens module according to the present invention.

Before the present invention is described in greater detail, it should be noted that like elements are denoted by the same reference numerals throughout the disclosure.

Referring to FIG. 1, an imaging lens module according to the present invention includes an optical lens set 1, a constant-aperture diaphragm 2, a filter 3 and a cover glasses 4, and is capable of forming an image on an imaging plane 5.

The optical lens set 1 includes a first optical lens 11, a second optical lens 12 and a third optical lens 13. The first, second and third optical lenses 11, 12, 13 are arranged sequentially from an object side to an image side along an optical axis (L) of the imaging lens module.

The first optical lens 11 has a positive refractive power near the optical axis (L). The first optical lens 11 has an object-side surface 111 that faces the object side and that is a convex surface, and an image-side surface 112 that faces the image side and that has a concave surface segment near the optical axis (L). At least one of the object-side surface 111 and the image-side surface 112 of the first optical lens 11 is aspheric.

The second optical lens 12 has a negative refractive power near the optical axis (L). The second optical lens 12 has an object-side surface 121 that faces the object side and that has a concave surface segment near the optical axis (L), and an image-side surface 122 that faces the image side and that is a convex surface. At least one of the object-side surface 121 and the image-side surface 122 of the second optical lens 12 is aspheric.

The third optical lens 13 has a positive refractive power near the optical axis (L). The third optical lens 13 has an aspheric object-side surface 131 that faces the object side, an asperhical image-side surface 132 that faces the image side, and a peripheral surface 133 that interconnects the object-side surface 131 and the image-side surface 132. At least one of the object-side surface 131 and the image-side surface 132 of the third optical lens 13 has at least one inflection point between the optical axis (L) and the peripheral surface 133.

The constant-aperture diaphragm 2 is disposed between the first optical lens 11 and the second optical lens 12. Ideally, the optical axis (L) extends precisely through centers of the first, second and third optical lenses 11, 12, 13 and the constant-aperture diaphragm 2. However, in actual assemblage, off-centre deviation(s) may occur, thereby incurring aberrations of the imaging lens module. As compared to the prior art, where the constant-aperture diaphragm is disposed between the first optical lens and the object side, having the constant-aperture diaphragm 2 of the present invention disposed between the first and second optical lenses 11, 12, aberrations resulting from off-centre deviation (s) may be reduced and a maximum viewing angle in the imaging plane 5 may be enlarged.

The imaging lens module satisfies the following equations:

$$0.8 < TL/Dg < 1.1, \tag{1}$$

$$0.50 < R3/R4 < 1.0, \tag{2}$$

$$0.1 < ct2/ct3 < 0.6, \tag{3}$$

$$0.2 < ct2/ct1 < 0.8, \tag{4}$$

in which, TL represents a length from the imaging plane 5 to the object-side surface 111 of the first optical lens 11 along the optical axis (L), Dg represents a length of a diagonal line of the maximum viewing angle on the imaging plane 5, R3 represents a radius of curvature of the object-side surface 121 of the second optical lens 12, R4 represents a radius of curvature of the image-side surface 122 of the second optical lens 12, ct1 represents a thickness of the first optical lens 11 along the optical axis (L), ct2 represents a thickness of the second optical lens 12 along the optical axis (L), and ct3 represents a thickness of the third optical lens 13 along the optical axis (L). The unit for the above listed parameters of equations (1) through (4) is millimeter.

The value of TL/Dg of the imaging lens module according to the present invention is controlled to be less than 1.1. According to Equation (1), the value of TL/Dg is directly proportional to TL when Dg is fixed, and is inversely proportional to Dg when TL is fixed. In other words, a smaller value of TL/Dg means a shorter length from the imaging plane 5 to the object-side surface 111 of the first optical lens 11 along the optical axis (L) under the circumstance that the length of the diagonal line of the maximum viewing angle on the imaging plane 5 is kept constant, and a greater length of the diagonal line of the maximum viewing angle on the imaging plane 5 under the circumstance that the length from the imaging plane 5 to the object-side surface 111 of the first optical lens 11 along the optical axis (L) is kept constant. That is to say, the upper limit of 1.1 imposed on the value of TL/Dg leads to an imaging lens module with a smaller size and a larger maximum viewing angle as compared to the prior art.

In addition, an aspheric surface satisfies the following equation:

$$z = \frac{ch^2}{1 + [1 - (k+1)c^2h^2]^{0.5}} + Ah^4 + Bh^6 + Ch^8 + Dh^{10} + Eh^{12} + Fh^{14} + Gh^{16} + Hh^{18} + Jh^{20} + \ldots, \tag{5}$$

in which, z is the z-component of the displacement of the aspheric surface from the vertex of the aspheric surface along the optical axis (L), at a distance h from the optical axis (L); k is a conic constant; c is the reciprocal of a radius of curvature; and A, B, C, D, F, G, H and J are aspheric coefficients. The aspheric surface may correct aberrations and decrease tolerance sensitivity, and also contribute to a wider viewing angle of the imaging lens module.

First Preferred Embodiment

FIG. 1 is a schematic view of a first preferred embodiment of an imaging lens module according to the present invention.

Figure 2:
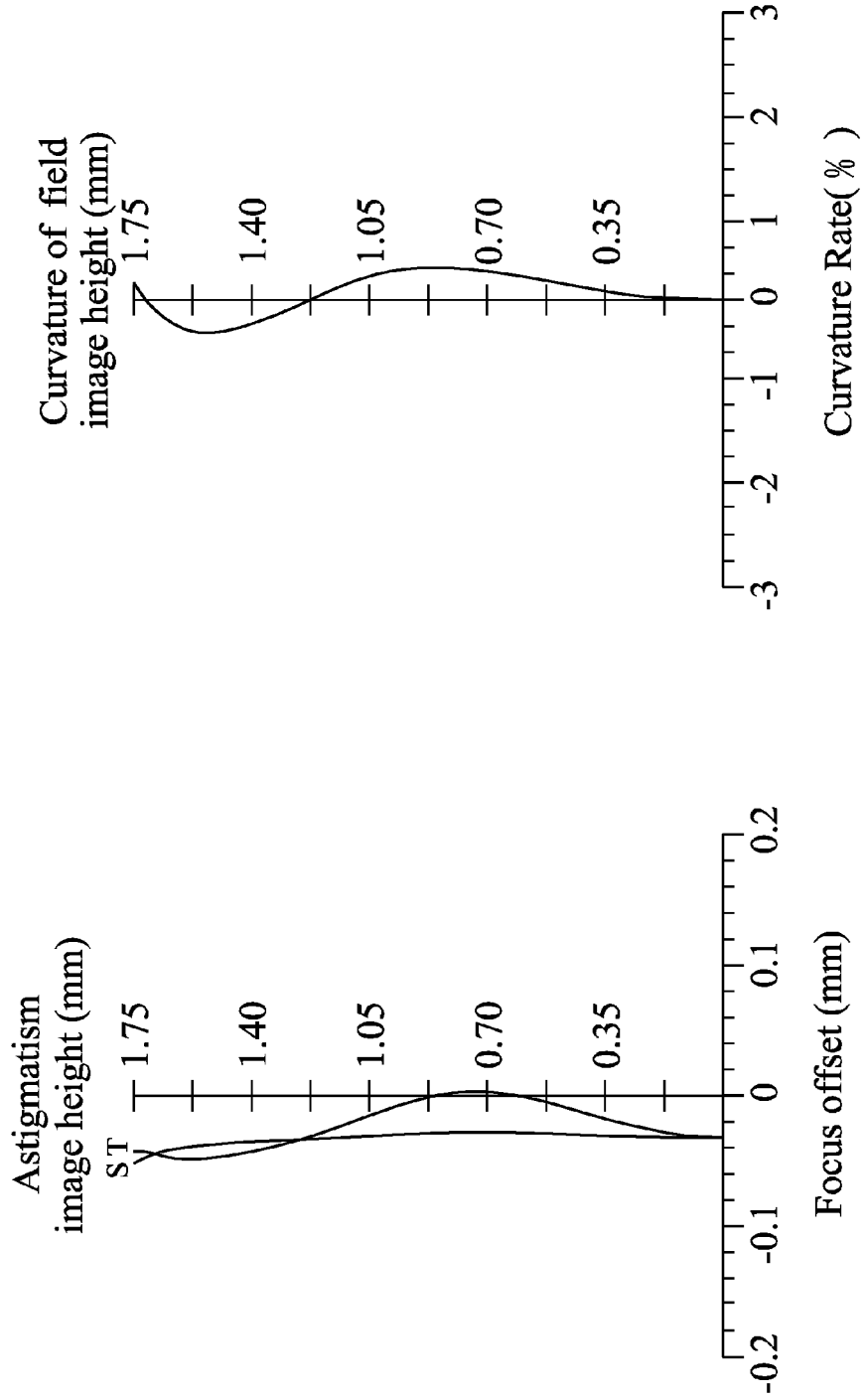
FIG. 2 shows simulation results of astigmatism and curvature of field of the first preferred embodiment.
Figure 3:
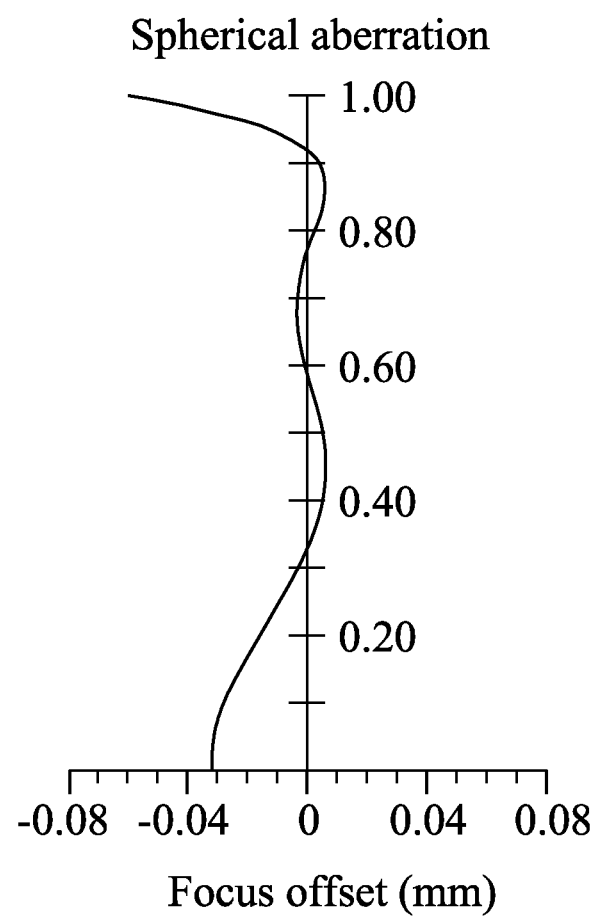
FIG. 3 shows a simulation result of spherical aberration of the first preferred embodiment.

FIG. 2 shows simulation results of astigmatism and curvature of field of the first preferred embodiment. FIG. 3 shows a simulation result of spherical aberration of the first preferred embodiment.

Each of the object-side surfaces 111, 121, 131 and the image-side surfaces 112, 122, 132 of the first, second and third optical lenses 11, 12, 13 is aspheric.

In this preferred embodiment, TL=3.23 mm, Dg=3.50 mm, R3=−0.55 mm, R4=−0.68 mm, ct1=0.548 mm, ct2=0.260 mm, and ct3=0.778 mm. As a result, TL/Dg=0.92, R3/R4=0.81, ct2/ct1=0.474, ct2/ct3=0.334, satisfying the equations (1) to (4).

Table 1 shows, as below, optical parameters of the optical lenses 11, 12, 13, the constant-aperture diaphragm 2, the filter 3 having an object-side surface 31 that faces the object side and an image-side surface 32 that faces the image side, and the cover glasses 4 having an object-side surface 41 that faces the object side and an image-side surface 42 that faces the image side of the first preferred embodiment according to the present invention.

TABLE 1

|  |  | Radius of Curvature | Thickness | Refractive Index (Nd) | Abbe Number (Vd) |
|---|---|---|---|---|---|
| First Optical Lens 11 | Object-Side Surface 111 | 0.81 | 0.548 | 1.514872 | 56.839305 |
|  | Image-Side Surface 112 | 2.25 | 0.036 |  |  |
| Constant-Aperture Diaphragm 2 |  | ∞ | 0.445 |  |  |
| Second Optical Lens 12 | Object-Side Surface 121 | −0.55 | 0.260 | 1.635500 | 23.891420 |
|  | Image-Side Surface 122 | −0.68 | 0.076 |  |  |
| Third Optical Lens 13 | Object-Side Surface 131 | 3.84 | 0.778 | 1.514872 | 56.839305 |
|  | Image-Side Surface 132 | 3.57 | 0.213 |  |  |
| Filter 3 | Object-Side Surface 31 | ∞ | 0.210 | 1.516800 | 64.167336 |
|  | Image-Side Surface 32 | ∞ | 0.212 |  |  |
| Cover glasses 4 | Object-Side Surface 41 | ∞ | 0.400 | 1.516800 | 64.167336 |
|  | Image-Side Surface 42 | ∞ | 0.054 |  |  |

Table 2 shows, as below, parameters of the aspheric surfaces 111, 112, 121, 122, 131, 132 of the first preferred embodiment according to the present invention.

TABLE 2

|   | First Optical Lens 11 | | Second Optical Lens 12 | | Third Optical Lens 13 | |
|---|---|---|---|---|---|---|
|   | Object-Side Surface 111 | Image-Side Surface 112 | Object-Side Surface 121 | Image-Side Surface 122 | Object-Side Surface 131 | Image-Side Surface 132 |
| k | 0 | −4.05 | 0.08 | −0.18 | −33.38 | 1.74 |
| A | −0.048107678 | 0.41034836 | 0.30965714 | 0.12328508 | −0.23603497 | −0.23576651 |
| B | 1.1210042 | −5.1648065 | 0.50456184 | 0.6110957 | 0.37375188 | 0.089797157 |
| C | −6.680537 | 42.184193 | 2.7800208 | −0.64243804 | −0.32557395 | −0.045613436 |
| D | 20.093701 | −45.461141 | −2.4793503 | 9.7761482 | 0.14820181 | 0.014156204 |
| E | −21.550377 | −587.41057 | 114.89417 | −8.5647598 | −0.027520691 | −0.0027652257 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Second Preferred Embodiment

Figure 4:
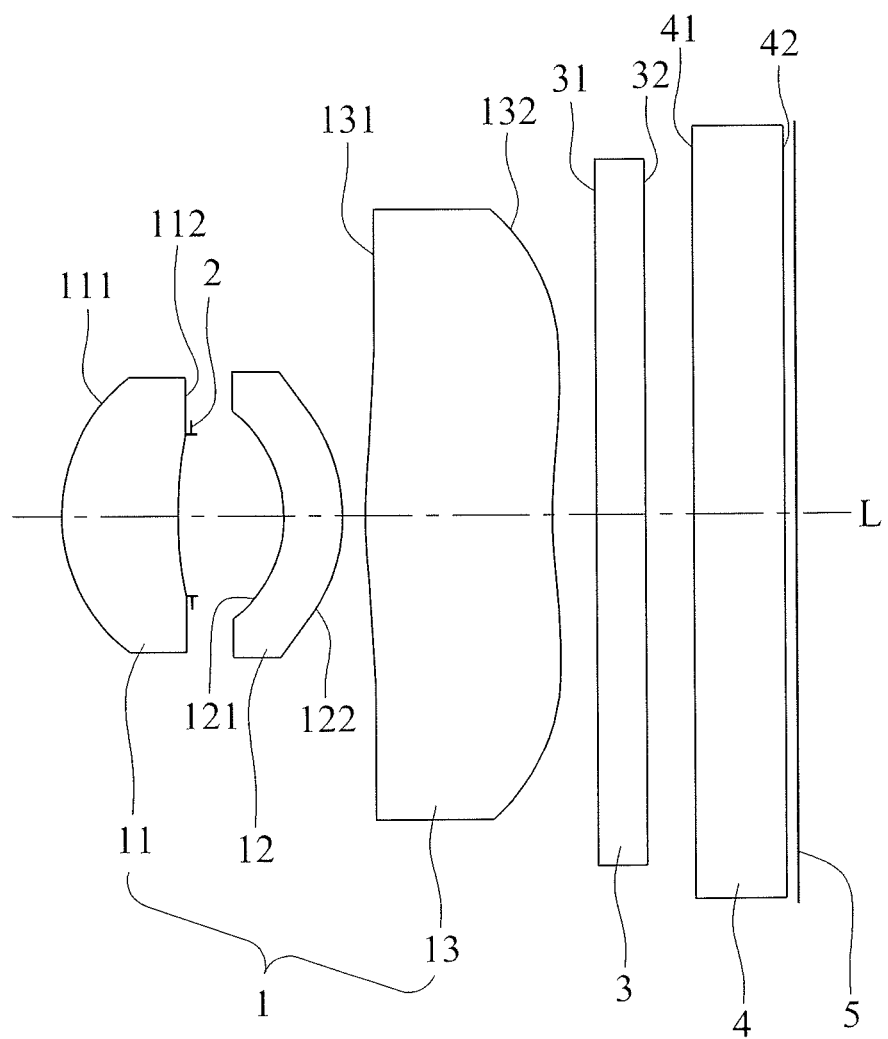
FIG. 4 is a schematic view of a second preferred embodiment of the imaging lens module according to the present invention.
Figure 5:
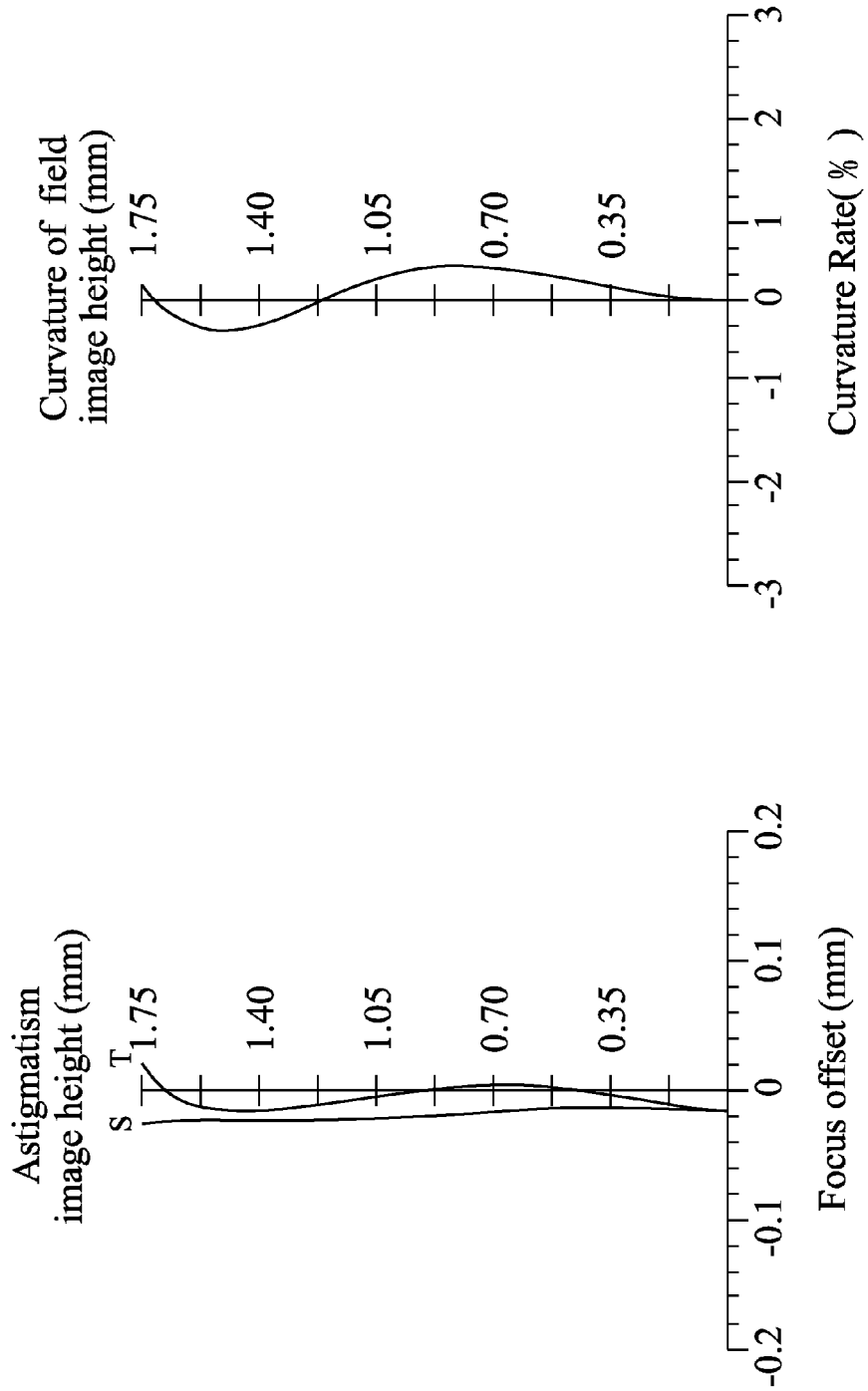
FIG. 5 shows simulation results of astigmatism and curvature of field of the second preferred embodiment.
Figure 6:
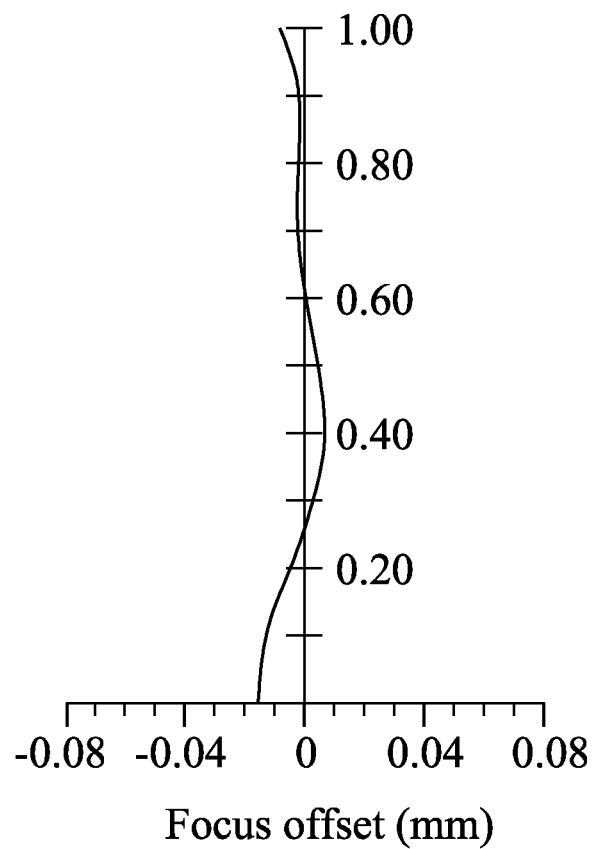
FIG. 6 shows a simulation result of spherical aberration of the second preferred embodiment.

FIG. 4 is a schematic view of a second preferred embodiment of the imaging lens module according to the present invention. FIG. 5 shows simulation results of astigmatism and curvature of field of the second preferred embodiment. FIG. 6 shows a simulation result of spherical aberration of the second preferred embodiment.

Each of the object-side surfaces 111, 121, 131 and the image-side surfaces 112, 122, 132 of the first, second and third optical lenses 11, 12, 13 is aspheric.

In this preferred embodiment, TL=3.23 mm, Dg=3.50 mm, R3=−0.54 mm, R4=−0.73 mm, ct1=0.504 mm, ct2=0.264 mm, and ct3=0.817 mm. As a result, TL/Dg=0.92, R3/R4=0.74, ct2/ct1=0.524, and ct2/ct3=0.323, satisfying the equations (1) to (4).

Table 3 shows, as below, optical parameters of the optical lenses 11, 12, 13, the constant-aperture diaphragm 2, the filter 3 and the cover glasses 4 of the second preferred embodiment according to the present invention.

TABLE 3

|   |   | Radius of Curvature | Thickness | Refractive Index (Nd) | Abbe Number (Vd) |
|---|---|---|---|---|---|
| First Optical Lens 11 | Object-Side Surface 111 | 0.79 | 0.504 | 1.514872 | 56.839305 |
|   | Image-Side Surface 112 | 2.18 | 0.076 |   |   |
| Constant-Aperture Diaphragm 2 |   | ∞ | 0.395 |   |   |
| Second Optical Lens 12 | Object-Side Surface 121 | −0.54 | 0.264 | 1.635500 | 23.891420 |
|   | Image-Side Surface 122 | −0.73 | 0.114 |   |   |
| Third Optical Lens 13 | Object-Side Surface 131 | 3.08 | 0.817 | 1.514872 | 56.839305 |
|   | Image-Side Surface 132 | 4.07 | 0.190 |   |   |
| Filter 3 | Object-Side Surface 31 | ∞ | 0.21 | 1.516800 | 64.167336 |
|   | Image-Side Surface 32 | ∞ | 0.209 |   |   |
| Cover glasses 4 | Object-Side Surface 41 | ∞ | 0.400 | 1.516800 | 64.167336 |
|   | Image-Side Surface 42 | ∞ | 0.054 |   |   |

Table 4 shows, as below, parameters of the aspheric surfaces 111, 112, 121, 122, 131, 132 of the second preferred embodiment according to the present invention.

TABLE 4

|   | First Optical Lens 11 | | Second Optical Lens 12 | | Third Optical Lens 13 | |
|---|---|---|---|---|---|---|
|   | Object-Side Surface 111 | Image-Side Surface 112 | Object-Side Surface 121 | Image-Side Surface 122 | Object-Side Surface 131 | Image-Side Surface 132 |
| k | 0.02 | −10.56 | 0.12 | −0.09 | −113.86 | 6.34 |
| A | 0.0009836809 | 0.45381237 | 0.27432225 | −0.20363054 | −0.19833952 | −0.22374733 |

TABLE 4-continued

|   | First Optical Lens 11 | | Second Optical Lens 12 | | Third Optical Lens 13 | |
|---|---|---|---|---|---|---|
|   | Object-Side Surface 111 | Image-Side Surface 112 | Object-Side Surface 121 | Image-Side Surface 122 | Object-Side Surface 131 | Image-Side Surface 132 |
| B | 0.50192466 | −5.3837603 | −2.186017 | 1.3515942 | 0.35437516 | 0.072517754 |
| C | −2.3792575 | 62.196869 | 28.980965 | −1.5797599 | −0.32110893 | −0.039777644 |
| D | 6.6822741 | −349.46857 | −103.08627 | 11.297364 | 0.140819 | 0.015238698 |
| E | −6.2109724 | 721.9483 | 269.13832 | −10.995837 | −0.023165084 | −0.004075131 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

To conclude, advantageous features of the imaging lens module according to the present invention are as follows:

1. The imaging lens module of the present invention satisfies the equation (1): $0.8 < TL/Dg < 1.1$. The upper limit of 1.1 imposed on the value of TL/Dg allows the imaging lens module to have a smaller size under the same maximum viewing angle as the prior art.

2. The imaging lens module of the present invention satisfies the equations (2) to (5), thereby increasing a resolving power thereof, enlarging the maximum viewing angle on the imaging plane 5, and decreasing the overall thickness thereof.

3. The constant-aperture diaphragm 2 of the present invention is disposed between the first and second optical lenses 11, 12. As a result, despite off-centre deviation of the optical lenses 11, 12, 13 and the constant-aperture diaphragm 2, aberrations of the present invention may be reduced and the maximum viewing angle on the imaging plane 5 may be enlarged.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens module comprising:
   an optical lens set including first, second and third optical lenses that are arranged sequentially from an object side to an image side along an optical axis of said imaging lens module,
     said first optical lens having a positive refractive power near the optical axis, said first optical lens having a convex object-side surface near the optical axis that faces the object side, and an image-side surface that faces the image side and that has a concave surface segment near the optical axis, wherein at least one of said object-side surface and said image-side surface of said first optical lens is aspheric,
     said second optical lens having a negative refractive power near the optical axis, said second optical lens having an object-side surface that faces the object side and that has a concave surface segment near the optical axis, and a convex image-side surface near the optical axis that faces the image side, wherein at least one of said object-side surface and said image-side surface of said second optical lens is aspheric,
     said third optical lens having a positive refractive power near the optical axis, and having an aspheric object-side surface that faces the object side, an aspheric image-side surface that faces the image side, and a peripheral surface that interconnects said object-side surface and said image-side surface, at least one of said object-side surface and said image-side surface of said third optical lens having at least one inflection point between the optical axis and said peripheral surface; and
   a constant-aperture diaphragm disposed between said first optical lens and said second optical lens;
   wherein said imaging lens module satisfies the following optical conditions:

$0.8 < TL/Dg < 1.1,$ $0.52 < R3/R4 < 1.0,$ and $0.2 < ct2/ct1 < 1.48,$ in which, TL represents a length from an imaging plane to said object-side surface of said first optical lens along the optical axis, Dg represents a length of a diagonal line of a maximum viewing angle on the imaging plane, R3 represents a radius of curvature of said object-side surface of said second optical lens, R4 represents a radius of curvature of said image-side surface of said second optical lens, ct1 represents a thickness of said first optical lens along the optical axis, and ct2 represents a thickness of said optical lens along the optical axis.

2. The imaging lens module as claimed in claim 1, satisfying the following optical condition:

$0.1 < ct2/ct3 < 0.6,$ in which, ct3 represents a thickness of said third optical lens along the optical axis.

* * * * *